United States Patent

[11] 3,574,302

[72] Inventor Denis G. Csathy
 Minneapolis, Minn.
[21] Appl. No. 882,196
[22] Filed Dec. 4, 1969
[45] Patented Apr. 13, 1971
[73] Assignee Raygo, Inc.
 Minneapolis, Minn.

[54] WASTE HEAT WATER TUBE BOILER
 6 Claims, 13 Drawing Figs.
[52] U.S. Cl. .................................................. 122/7,
 122/279, 122/367
[51] Int. Cl. ...................................................... F22b 1/18
[50] Field of Search .......................................... 122/7, 235,
 367, 279

[56] References Cited
 UNITED STATES PATENTS
 2,569,155 9/1951 Drago et al. ................. 122/279
 1,883,925 10/1932 Hyde ............................ 122/279
 2,372,992 4/1945 Wallis et al. ................... 122/7
 3,254,634 6/1966 Vorkauf ......................... 122/7

Primary Examiner—Kenneth W. Sprague
Attorney—Ira Milton Jones

ABSTRACT: A water tube boiler with vertically spaced parallel steam and mud drums connected by vertical downcomer tubes and an angle shaped bank of heating tubes, the downcomer tubes and the angle shaped bank of heating tubes defining a triangle, and a boxlike casing enclosing all of the heating tubes with one upright wall thereof closely adjacent to the downcomer tubes and the opposite upright wall closely adjacent to the apex of the angle shaped bank and having a baffle wall joined thereto, which baffle wall bisects the angle defined by the bank of heating tubes but is spaced from the casing wall which is adjacent to the downcomer tubes, so that hot gases entering the casing at one side of the baffle wall and leaving the casing at the other side thereof must flow successively through the two angularly disposed legs of the bank of heating tubes.

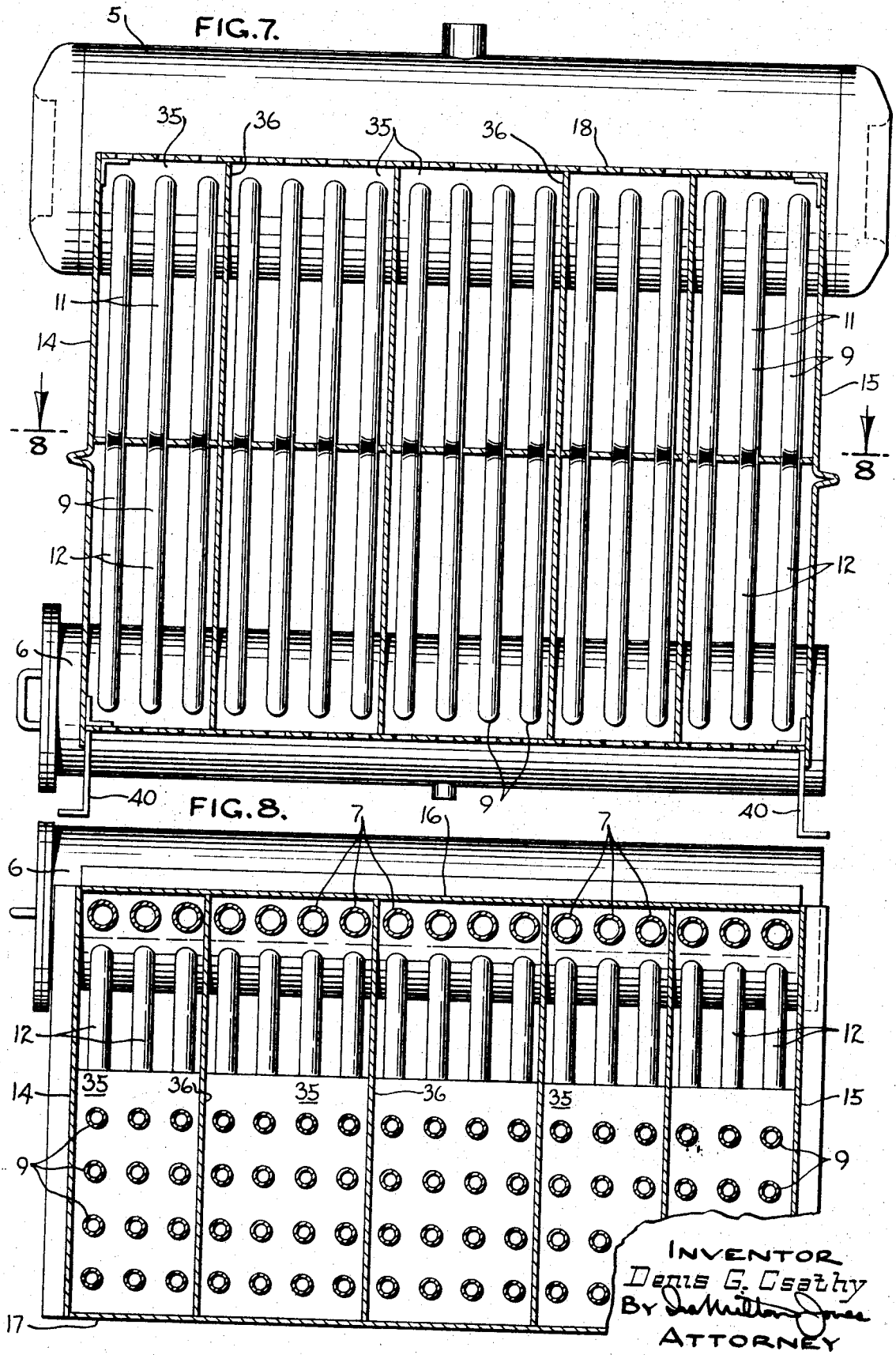

WASTE HEAT WATER TUBE BOILER

This invention relates to water tube boilers and has as its purpose and object to provide a compact natural circulation water tube boiler especially well adapted for use with gas turbines to recover otherwise wasted heat.

Another object of the invention is to provide a package-type boiler which is completely assembled at the factory of standardized modular components, that can be combined to produce boilers of different capacities.

Still another object of this invention is to provide a waste heat boiler intended primarily for use with gas turbines, and which possesses great flexibility in its adaptability to the different gas flow conditions encountered in various gas turbine installations.

A further object of this invention is to provide a boiler which is extremely simple in design and construction and which consists essentially of superimposed parallel steam and mud drums connected by downcomer tubes and a bank of heating tubes arranged in a new and novel way, with all of the tubes directly joined to the drums to obviate headers and flanged connections and eliminate the problems inherent in their use.

With these observations and objectives in mind, the manner in which the invention achieves its purpose will be appreciated from the following description and the accompanying drawings which exemplify the invention, it being understood that such changes in the specific apparatus disclosed herein may be made as come within the scope of the appended claims.

The accompanying drawings illustrate two complete examples of the embodiments of the invention constructed according to the best modes so far devised for the practical application of the principles thereof, and in which.

Figure 2:
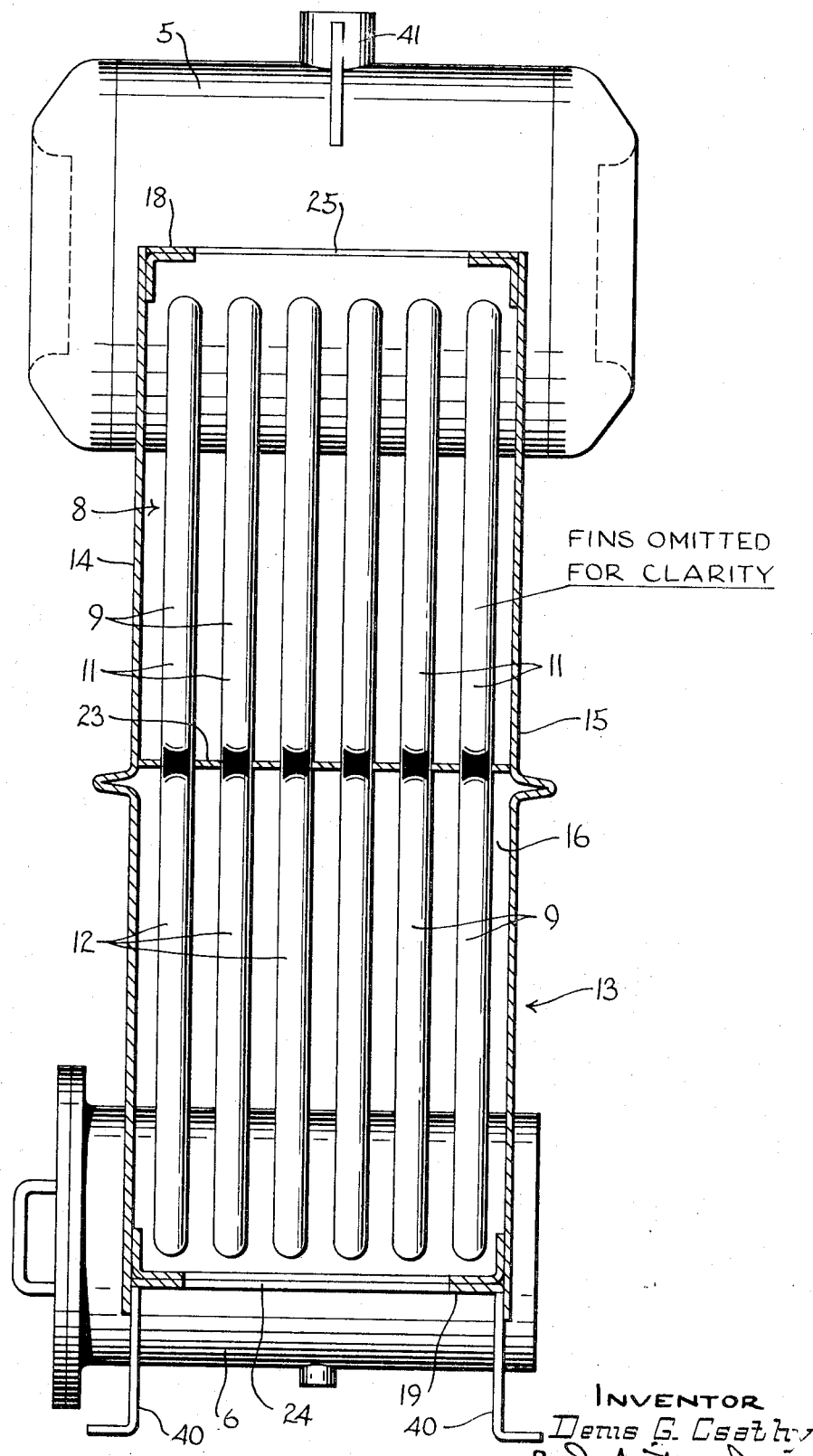
FIG. 2 is a vertical sectional view through FIG. 1 on the plane of the line 2–2.
Figure 4A:
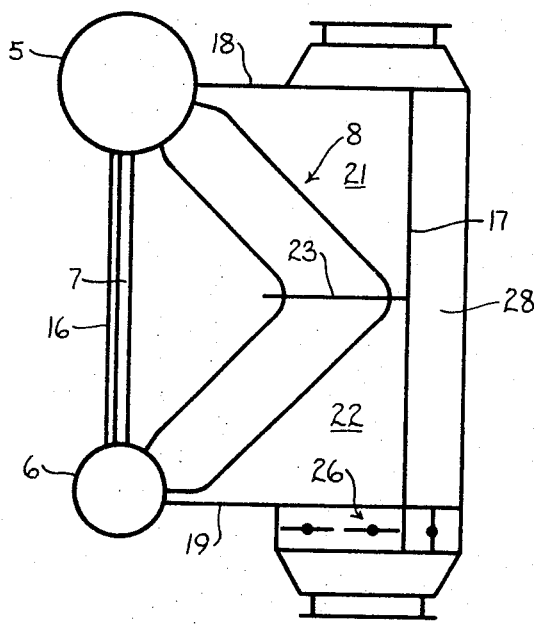
Figure 4B:
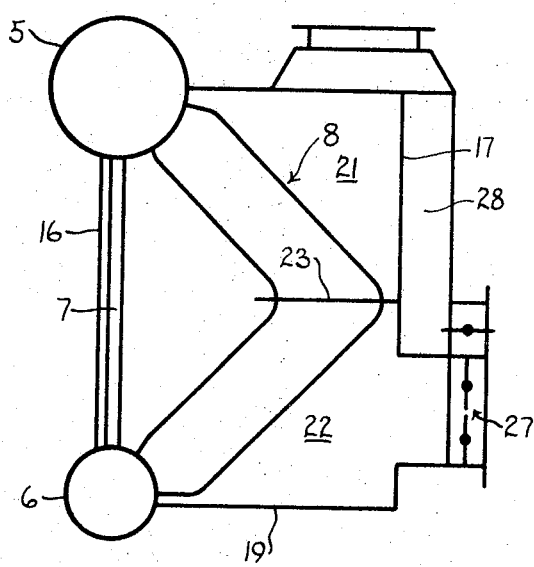
Figure 5:
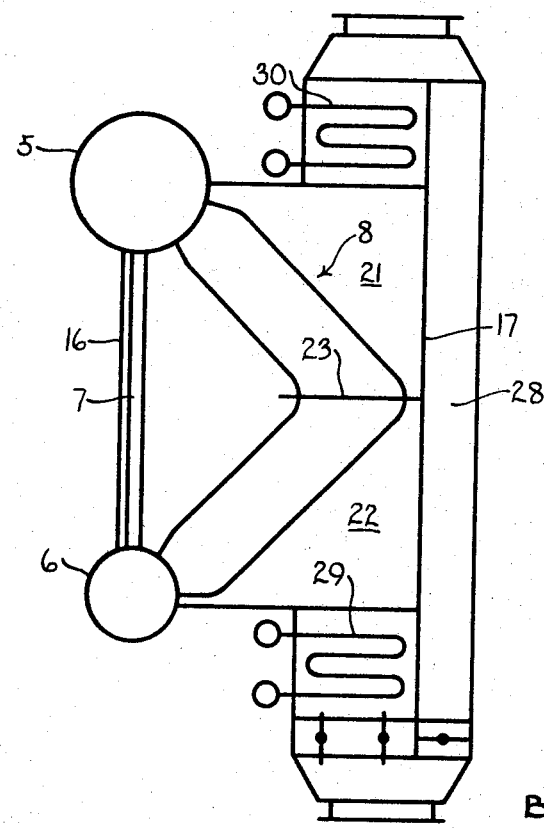
Figure 6:
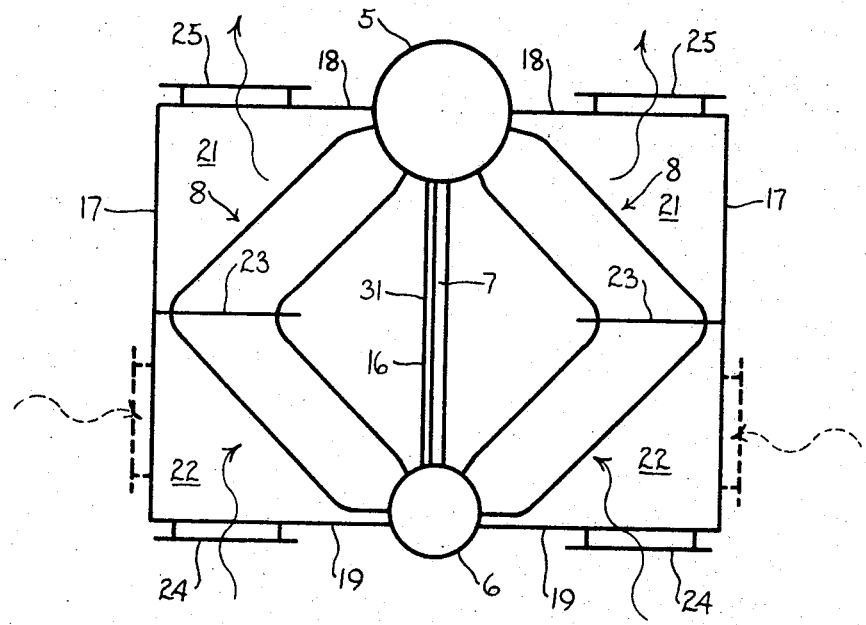
Figure 9:
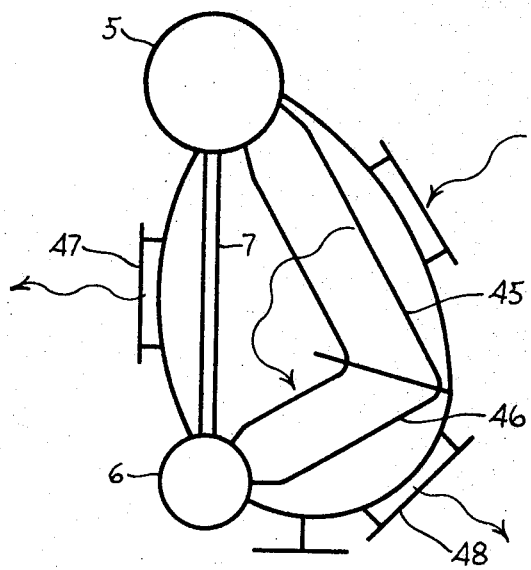

FIGS. 4a and 4b diagrammatically illustrate two ways in which the hot donor gases can be shunted around the boiler;

FIG. 5 diagrammatically illustrates one way in which the boiler can be incorporated in a more sophisticated heat utilization system;

FIG. 6 diagrammatically illustrates how the steam and mud drums of the boiler of this invention can be used with two banks of heating tubes to utilize waste heat from two different sources;

FIG. 7 is a vertical sectional view similar to FIG. 2, illustrating another way of adapting the boiler of this invention to a plurality of waste heat sources;

FIG. 8 is a horizontal sectional view through FIG. 7 on the plane of the line 8–8; and FIG. 9 diagrammatically illustrates a modified embodiment of the invention.

Referring to the accompanying drawings, the numerals 5 and 6 designate, respectively, the steam drum and the mud drum of the boiler of this invention. These drums are of conventional design and construction, round in cross section, and superimposed one above the other, in which relationship they are maintained by a plurality of downcomer tubes 7 that extend vertically between the drums and have their opposite ends suitably secured thereto. The downcomer tubes, of course provide for flow of water from the steam drum to the mud drum.

The drums are also connected by a bank 8 of heating tubes 9. Like the downcomer tubes, the heating tubes have their ends secured directly to the drums, and collectively they provide for flow from the mud drum to the steam drum, where a baffle 10 across the mouths of the tubes promotes separation of the steam from liquid.

As is customary, the tubes 9 have extended surface fins 9', but the arrangement of the tubes and the bank formed thereby is considerably different from any prior bailer heating surface. It is in this respect that the present invention distinguishes the prior art and achieves unprecedented cost economy due to standardization.

By the simple expedient of bending all of the tubes, medially of their ends, through the same angle, preferably 90°, and arranging the tubes in sections which lie in planes normal to the axes of the drums, and having all of the bends aligned, the bank of tubes which is composed of a plurality of such tube sections, has angularly disposed legs 11 and 12. Obviously, of course, the tubes comprising each section are progressively longer from the interior of the angle to the exterior thereof, but all of the sections are identical as to the length of their respective tubes. This achieves a significant cost saving due to the standardization in tube lengths.

The bank of heating tubes is enclosed in a boxlike casing 13 which has four upright walls, a front wall 14, a rear wall 15 and two sidewalls 16 and 17, all connected by top and bottom walls 18 and 19, respectively. Although the downcomer tubes 7 may be either inside or outside the casing, in the present case they are on the inside, closely adjacent to the sidewall 16. This wall is equipped with a door 20 through which access may be had to the interior of the casing.

Figure 1:
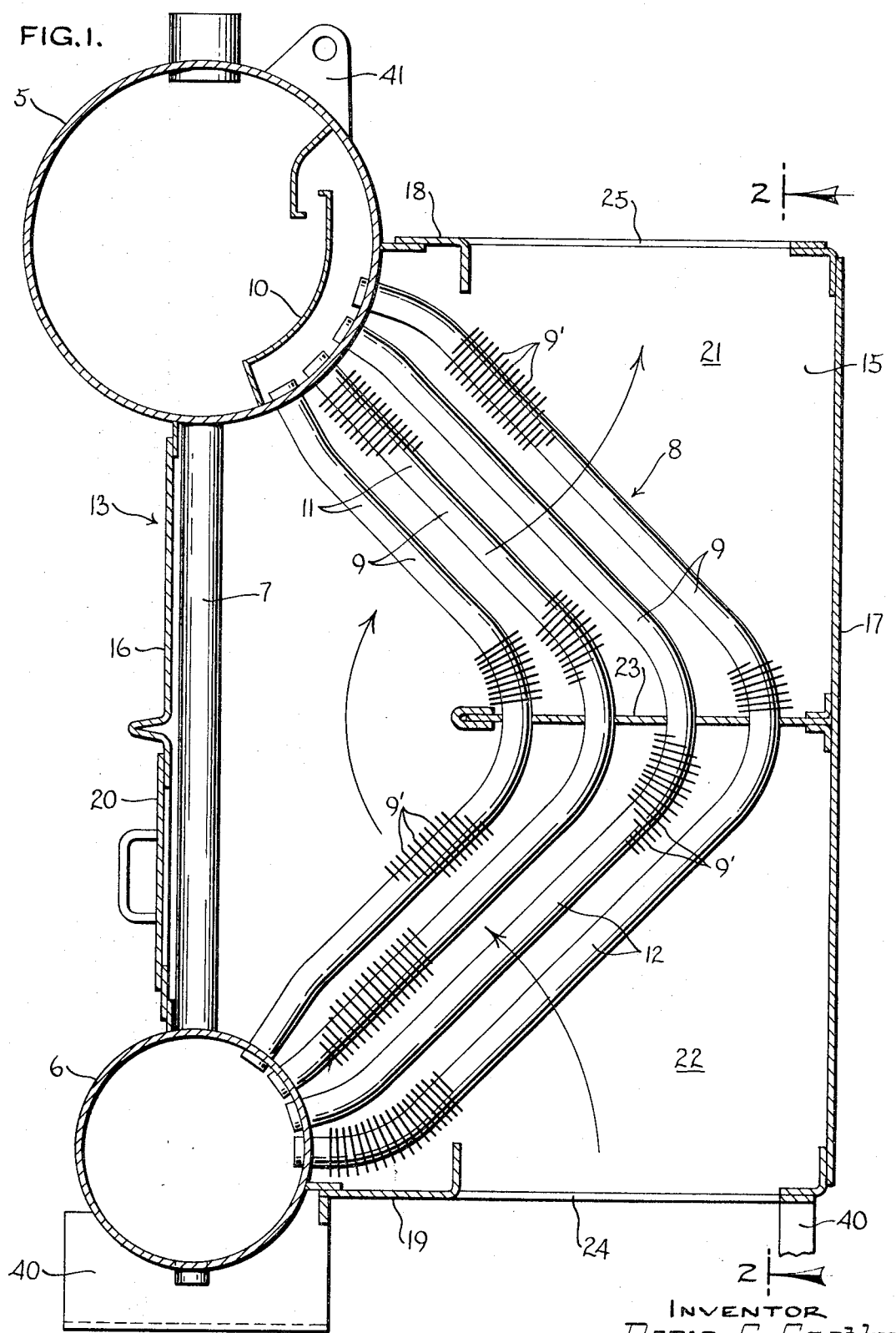
FIG. 1 is a vertical sectional view through a boiler embodying this invention.

It should be noted that the right angularly disposed legs of the bank of tubes together with the downcomer tubes and the sidewall 16 form an isosceles triangle having its apex closely adjacent to the other sidewall 17. The front and rear walls, as seen in FIG. 2, (and also in FIGS. 7 and 8) are closely adjacent to the endmost tube sections comprising the bank. The legs of the tube bank together with the top and bottom walls and the sidewall 17 thus form two superimposed upper and lower spaces 21 and 22. These spaces are triangular when viewed from the front of the boiler as in FIG. 1.

A baffle wall 23 which lies on a plane that bisects the included angle between the legs of the bank and has the bends of all of the tubes passing therethrough, separates and spaces 21 and 22. This baffle, which is a flat and rectangular has one marginal edge thereof joined to the sidewall 17 and its two adjacent marginal edges joined to the front and rear walls 14 and 15. The fourth edge of the baffle wall, which is inside the angle defined by the legs of the tube bank, is spaced a substantial distance from the sidewall 16.

Communication from one to the other of the spaces 21 and 22 is thus possible only through the spaces between the tubes comprising the two legs of the bank. Hence by providing one of the spaces 21—22 with an inlet 24 and the other with an outlet 25 to connect the casing with a source of hot gases and a flue duct or the like, these gases will be constrained to flow successively and transversely across the tubes of the two legs of the bank. There are therefore two gas passes each of which abstracts an amount of heat from the donor medium and indirectly transfers it to the recipient fluid medium circulating through the heating tubes.

Figure 3A:
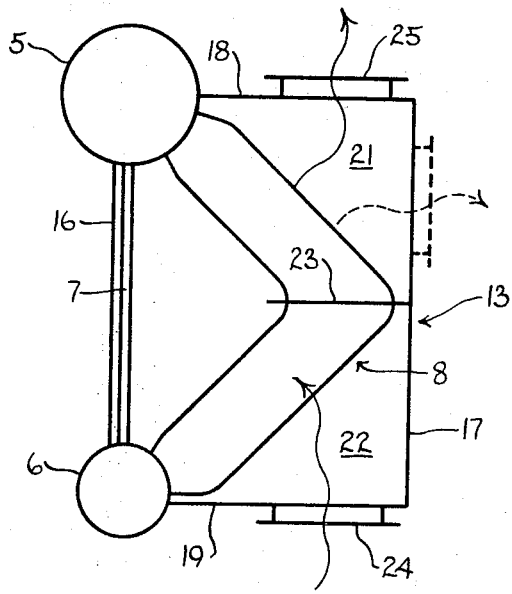
FIGS. 3a, 3b, 3c and 3d are diagrammatic views of the boiler to show its versatility in adaption to different gas flow conditions.
Figure 3B:
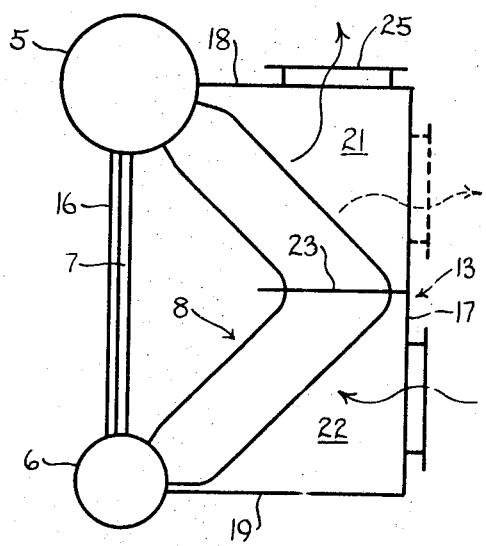
Figure 3C:
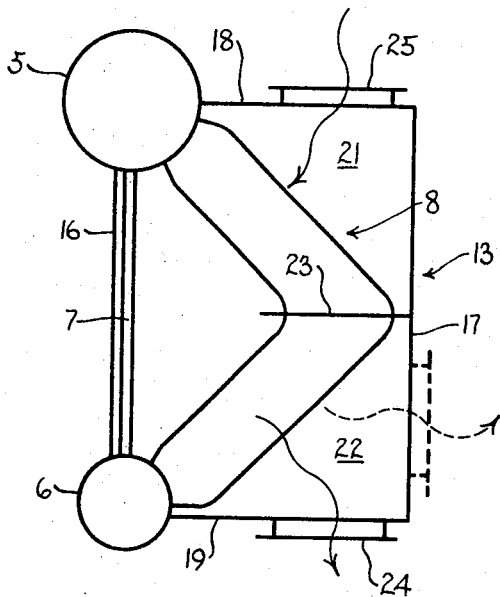
Figure 3D:
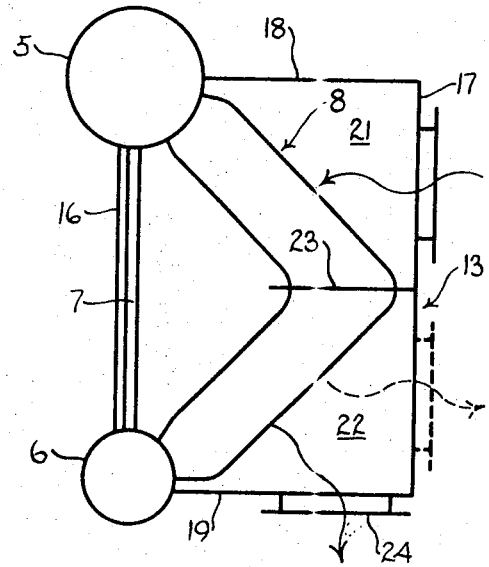

As shown in FIGS. 3a to 3d, inclusive, the novel shape and disposition of the bank of heating tubes and specifically the symmetrical arrangement of the two legs of the bank with respect to the baffle wall provides great latitude in the location of the inlet and outlet through which the hot gases enter and leave the casing. In FIG. 3a the gases enter the lower triangular space 22 through the bottom wall and leave the upper space 21 either through the top wall or the sidewall 17. In FIG. 3b the inlet is in the sidewall 17 which again opens to the lower space 22, and the outlet is in either the same sidewall 17 or in the top wall. In FIG. 3c the inlet is in the top wall and the outlet is in either the bottom wall or the sidewall 17. In FIG. 3d, the inlet is in the sidewall 17 and leads to the upper space 21, and the outlet from the lower space is either through the bottom wall or the sidewall 17.

This flexibility in the location of the inlet and outlet for the heating gases, adapts the boiler exceptionally well to use with gas turbines, since some of them discharge downwardly, some upwardly and some horizontally. No matter what the situation may be, the boiler can be directly connected with the turbine, for with the possibilities depicted in FIGS. 3a to 3d, eight different combinations of gas flow can be obtained with no change other than the location of the inlet and outlet openings.

Another advantageous feature of the invention resides in the fact that the boiler lends itself readily to utility in more sophisticated heat utilization systems. Thus as shown in FIGS. 4a and 4b, the addition of simple duct work enables gas flow to be shunted past the boiler. This is done by merely providing interconnected dampers 26 and 27 to control entry into the inlet of the boiler and a bypass 28. And as shown in FIGS. 5 a superheater 29 and an economizer 30 are easily added to the boiler, again without affecting its basic design.

Another significant advantage of this invention lies in its adaptability to "doubling-up" as shown in FIG. 6. In this case the two superimposed drums and their connecting downcomers coact with two banks of heating tubes arranged back to back at opposite sides of a partition wall 31 which may be the wall 16 of a single boiler unit. These two back-to-back units are mirror images of each other and each, of course, has a baffle wall intersecting the bends of the tubes comprising its respective banks. With this doubled-up arrangement, heat from two different sources can be utilized to deliver steam to a single steam drum.

Another way of adapting the boiler to utilization of heat from more than one source thereof, as for instance a number of gas turbines, is illustrated in FIGS. 7 and 8 wherein the casing is divided into a plurality of side by side compartments 35 by partition walls 36 that are normal to the axes of the drums. Each of these compartments contains a bank of heating tubes made up of several tube sections, the number of which depends upon the heat available at the different sources. Each compartment 35, of course, has its own gas inlet and outlet, so that the several gas flow passages are independent of one another. This enables the boiler to be used with a number of gas turbines, since it eliminates the possibility that back pressure in one turbine will affect and thereby prevent starting of another turbine. Yet nothing more than lengthening of the boiler is required.

The versatility achieved by this invention however, is not its only major attribute. Perhaps even more important is the fact that the novel construction lends itself extremely well to standardization and modularity. Thus for a wide range of capacities, the tube sections can be identical. Of course as noted hereinbefore, the tubes comprising each section are of different lengths, but from section to section they are identical. Accordingly only a few different sized tubes need be stocked for a wide range of boiler capacities.

This invention has a still another important advantage, which resides in the the fact that the boiler is self-supporting. Since the downcomer tubes not only communicate the steam and mud drums, but also mechanically and structurally connect them, no other structure is needed to keep the steam and mud drums properly oriented. This simplifies the design of the casing since it obviates the need for dependence upon any of the casing structure for support of the boiler, either when set upon a foundation, in which event a leg structure 40 joined to the mud drum carries the weight of the boiler; or when suspended, for which purpose the steam drum is equipped with one or more lifting lugs 41.

In the boiler thus far described, the two legs of the angularly shaped bank of tubes are symmetrical so that the gas passes formed thereby are identical. For some purpose though it is necessary that the gas passes have different flow areas. For instance, in the recovery of sulfur from sour gas it is desirable to withdraw some of the gas at a predetermined temperature. For this purpose the modified form of the basic boiler construction, shown in FIG. 9, can be employed. In this case one of the legs 45 of the bank of heating tubes is longer than the other leg 46, and the inlet for the hot gases directs them first across the long leg 45. Because of the greater flow area of the pass through the leg 45, the temperature of the gases is reduced the desired amount for discharge of a part thereof through an outlet 47, while the remainder flows across the tubes of the shorter leg 46 to be discharged at a much cooler temperature through a second outlet 48.

Those skilled in the art will appreciate that the invention can be embodied in forms other than as herein disclosed for purposes of illustration.

I claim:

1. In a water tube boiler comprising upper and lower parallel drums connected by tubular downcomer means and by a bank of heating tubes, the latter being disposed in a casing which has inlet means and outlet means, so that indirect heat exchange may be effected between a gaseous donor medium flowing through the casing and a recipient fluid medium circulating through the heating tubes, the improvement which comprises:

A. all of the heating tubes in the entire bank having their ends joined directly to the drums and said tubes being parallel with one another throughout their length;

B. all of the heating tubes being bent in the same direction and through substantially the same angle intermediate the ends thereof, so that the bank of heating tubes has angularly disposed legs;

C. the tubular downcomer means being joined directly to the drums and extending across the space between the ends of the angularly disposed legs;

D. the bends of all of the heating tubes being aligned and the included angle between the angularly disposed legs of the bank being bisected by a plane which intersects the bends of all of the heating tubes; and E. a baffle wall in said casing between its inlet means and outlet means and substantially on said plane, the bends of the heating tubes passing through the baffle wall, and the marginal edges of the baffle wall, with the exception of the edge thereof inside the angle defined by the bank of heating tubes, being contiguous to the adjacent walls of the casing, so that gases flowing from the inlet means to the outlet means are constrained to pass successively through the two angularly disposed legs of the bank of heating tubes.

2. In a water tube boiler, the improvement set forth in claim 1, further characterized in that the casing has a pair of opposing substantially vertical walls, one of which is adjacent to the apex of the the angle shaped bank of heating tubes and has one edge of the baffle wall joined thereto, and the other being adjacent to the tubular downcomer means and being spaced a substantial distance from the baffle wall.

3. The water tube boiler of claim 1, wherein said downcomer means comprises a plurality of tubes each substantially larger in cross section than the heating tubes, and wherein said downcomer tubes mechanically connect the upper and lower drums and secure the same against relative displacement, so that whether the boiler stands on a foundation or is suspended from above, it is secure against deformation and requires no extraneous reinforcing.

4. In a water tube boiler, the improvement set forth in claim 1, further characterized in that the casing is box-shaped and has opposed upright front and rear walls, opposed upright sidewalls and top and bottom walls, one of the sidewalls being closely adjacent to the tubular downcomer means and the other sidewall being closely adjacent to the apex of the angle shaped bank of heating tubes, and the bank of heating tubes, and the bank of heating tubes extending from the front wall to the rear wall of the casing, the upper and lower drums being at the junctions of the top and bottom walls with the sidewall that is adjacent to the tubular downcomer means;

each drum having a portion thereof exposed to the interior of the boxlike casing, the junctions of the ends of the heating tubes with the drums being at said portions of the drums;

the angularly disposed legs of the bank of heating tubes, the top and bottom walls, the front and rear walls and the sidewall which is closely adjacent to the apex of the angle shaped bank of heating tubes coacting to form upper and lower triangularly shaped chambers, one above and the other below the baffle wall, and said inlet means being on one of said walls of one said triangular chambers and said outlet means being on one of said walls of the other triangular chamber.

5. The water tube boiler of claim 4, wherein said sidewall which is closely adjacent to the tubular downcomer means is substantially flat and lies in a plane that longitudinally intersects both drums; and wherein said upright sidewall which is closely adjacent to the tubular downcomer means coacts with three other upright walls and another pair of top and bottom walls to define a second casing similar to said boxlike casing recited in claim 4, and wherein said second casing contains a duplicate but mirror image of the heating tubes and baffle wall in said boxlike casing, so that both banks of heating tubes utilize the same drums and downcomer means to form two circulatory systems.

6. In a water tube boiler the improvement set forth in claim 1, further characterized in that the heating tubes are arranged in sections with all of the tubes of each section side by side in a straight row normal to the axes of the drums, and the sections being substantially uniformly spaced apart along the length of the drums; partition walls in the casing between certain adjacent tube sections dividing the casing interior into a plurality of compartments, each containing at least one tube section; and said inlet means and outlet means being plural, a pair thereof opening to each of said compartments, so that the several compartments can be individually connected with different sources of gaseous donor medium and the pressure conditions in one compartment have no affect upon the pressure conditions in any other compartment.